United States Patent [19]

Weber

[11] Patent Number: 4,840,420
[45] Date of Patent: Jun. 20, 1989

[54] CONVERTIBLE TOP

[76] Inventor: Darrell A. Weber, 712 9 St, N.E., Minot, N. Dak. 58701

[21] Appl. No.: 117,327

[22] Filed: Nov. 6, 1987

[51] Int. Cl.⁴ .......................... B60J 7/12; B62K 27/16
[52] U.S. Cl. ................................ 296/116; 216/120.1; 280/203
[58] Field of Search ....................... 296/78 R, 78.1, 79, 296/107, 109, 116, 120 A, 117, 102, 120 R, 121; 280/203

[56] References Cited

U.S. PATENT DOCUMENTS

| 194,516 | 8/1977 | Fitzgerald | 296/102 |
| 593,584 | 11/1897 | Jewett | 296/102 |
| 1,551,889 | 9/1925 | Lopez | 296/109 |
| 2,942,914 | 6/1960 | Noot | 296/102 |

FOREIGN PATENT DOCUMENTS

| 131380 | 7/1932 | Austria | 296/78.1 |
| 140281 | 3/1920 | United Kingdom | 296/78.1 |
| 153100 | 11/1920 | United Kingdom | 296/116 |
| 159575 | 2/1921 | United Kingdom | 280/203 |
| 177675 | 4/1922 | United Kingdom | 296/78.1 |
| 200271 | 7/1923 | United Kingdom | 296/78.1 |

Primary Examiner—Dennis H. Pedder
Attorney, Agent, or Firm—Jerry T. Kearns

[57] ABSTRACT

A convertible top for a motorcycle sidecar has a rigid collapsible frame which folds onto the rear of the sidecar when not in use. The frame has a pair of spaced clamps for securing the frame in an erected condition to the windshield of the sidecar. A foldable fabric top is disposed over the collapsible supporting frame and is attachable to the sides and windshield of the sidecar by snaps. The fabric top may be provided with portholes and windows, which may be secured in a closed position by hook and loop fasteners.

2 Claims, 5 Drawing Sheets

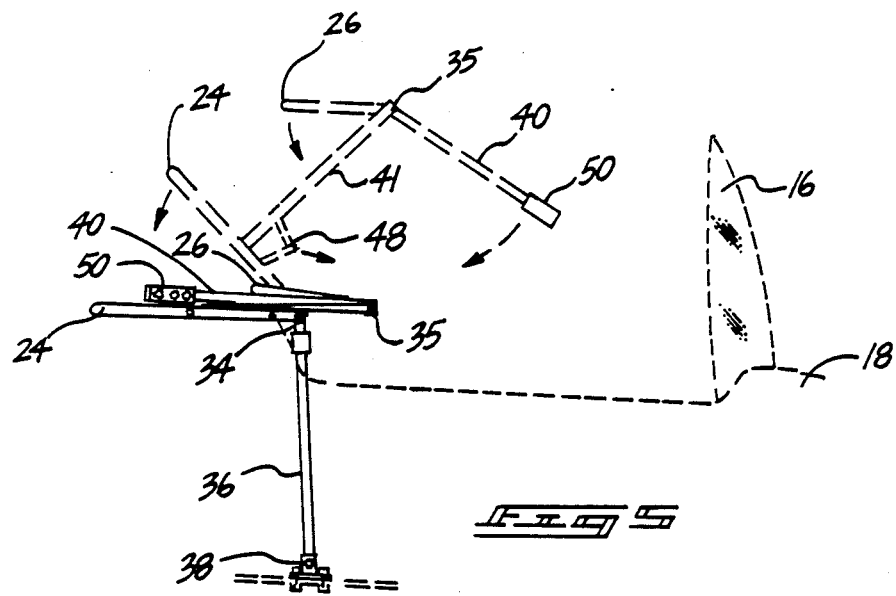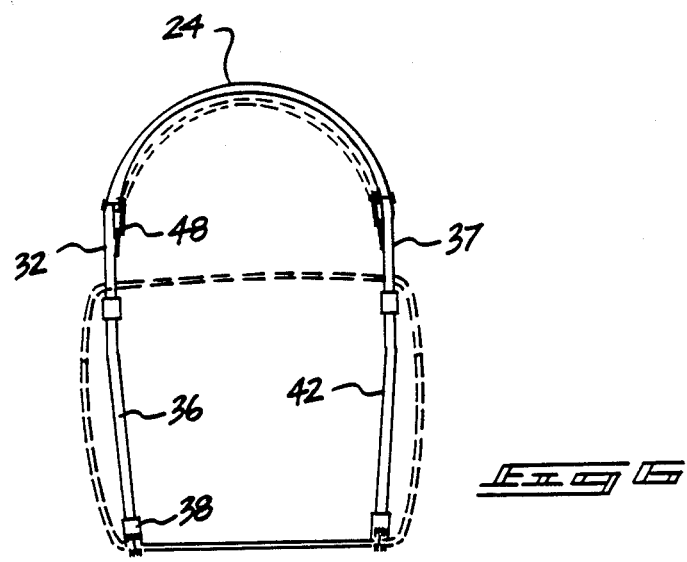

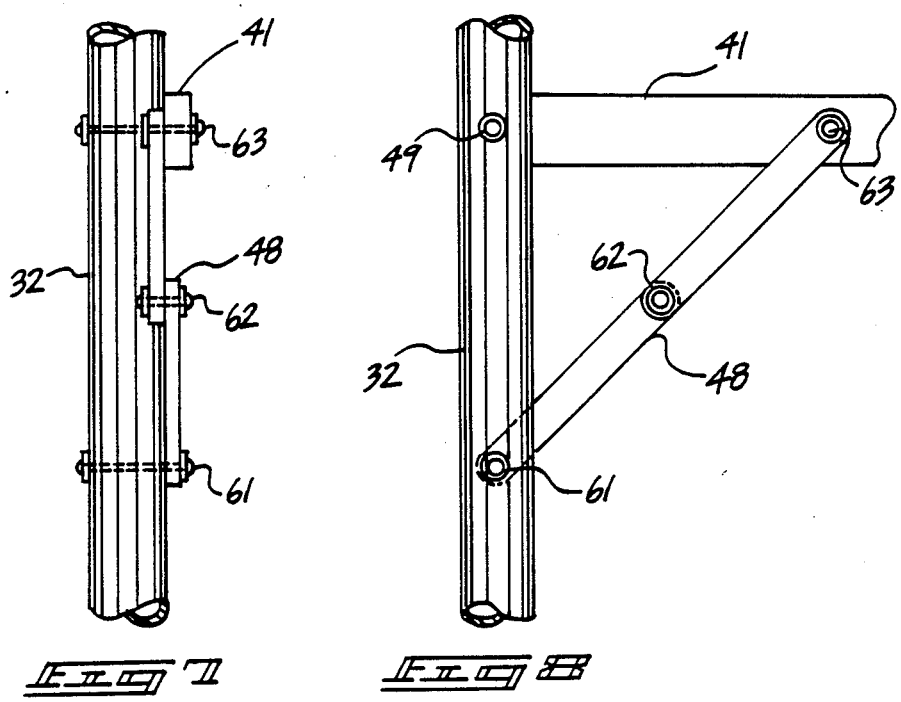
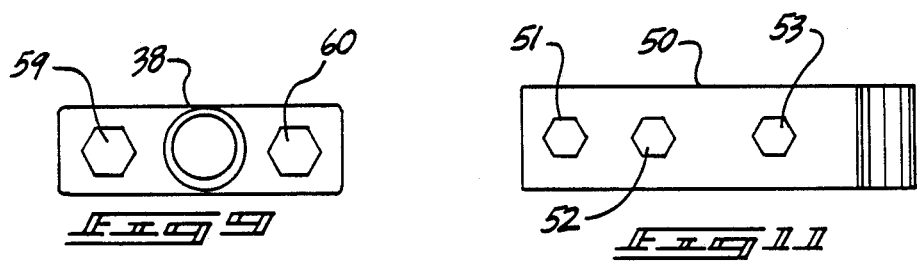
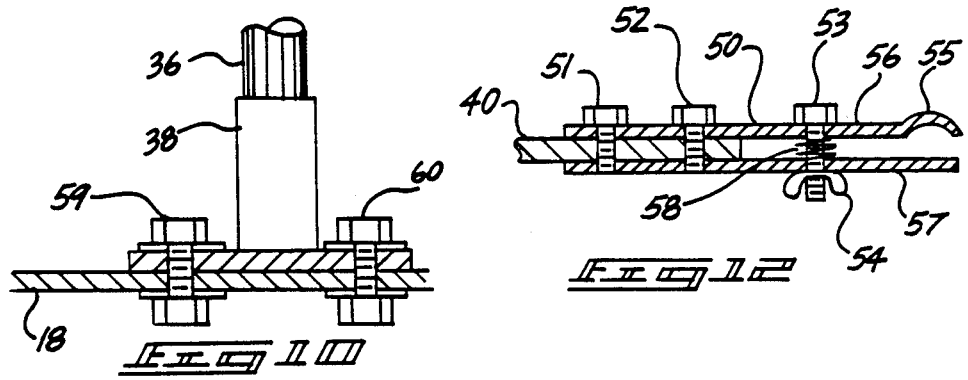

CONVERTIBLE TOP

BACKGROUND OF THE INVENTION

1. Field of the Invention

The present invention relates to convertible tops, and more particularly pertains to a new and improved convertible top for use with motorcycle sidecars. Currently, motorcycle sidecars are not available with convertible tops. Snap-on tonneau covers are available for protecting the interior of the sidecar against the elements, but these covers do not afford protection for a sidecar passenger. In order to overcome these problems, the present invention provides a convertible top for a sidecar which may be folded between lowered and raised positions. The convertible top is suitable for the protection of passengers or items stored for transport in the sidecar.

2. Description of the Prior Art

Various types of convertible tops are known in the prior art. A typical example of such a convertible top is to be found in U.S. Pat. No. 745,022, which issued to T. Loftus on Nov. 24, 1903. This patent discloses a folding top for vehicles which utilizes a plurality of spaced upstanding supports which are mounted on slide ways. Pivotal supports disposed between the top portions of these upstanding supports fold between open and closed positions. A fabric cover extends over the pivotal supports. U.S. Pat. No. 1,699,918, which issued to T. Poynton on Jan. 22, 1929, discloses an automobile having a convertible top which folds to the rear of the vehicle in an accordion like manner. U.S. Pat. No. 2,309,242, which issued to C. Dumelin on Jan. 26, 1943, discloses a convertible top for a vehicle which utilizes a plurality of spaced pivotal supports to support a fabric top. U.S. Pat. No. 3,606,448, which issued to J. Walker on Aug. 29, 1969, discloses a foldable truck bed cover which provides a pair of spaced tracks mounted on the side truck bed edges with slidable supports for a flexible fabric cover. In a closed position, the supports slide toward the cab of the truck, folding the fabric cover in an accordion like fashion, thus exposing the truck bed. U.S. Pat. No. 4,285,539, which issued to R. Cole on Aug. 25, 1981, discloses a retractable tonneau top for use on the open bed of a truck. The tonneau top includes a piece of covering material which is carried by a stationary bow, a movable bow, and a plurality of intermediate bows which are located between the stationary and movable bows. A crank chain drive is provided for selectively extending or retracting the tonneau top.

While the above mentioned devices are suited for their intended usage, none of these devices provides a convertible top suitable for usage with a motorcycle sidecar. Additionally, none of the aforesaid devices disclose a convertible top which include a frame having a pair of pivotally connected bows and clamps for engaging the windshield of a sidecar. Inasmuch as the art is relatively crowded with respect to these various types of convertible tops, it can be appreciated that there is a continuing need for and interest in improvements to such convertible tops, and in this respect, the present invention addresses this need and interest.

SUMMARY OF THE INVENTION

In view of the foregoing disadvantages inherent in the known types of convertible tops now present in the prior art, the present invention provides an improved convertible top. As such, the general purpose of the present invention, which will be described subsequently in greater detail, is to provide a new and improved convertible top which has all the advantages of the prior art convertible tops and none of the disadvantages.

To attain this, a representative embodiment of the concepts of the present invention is illustrated in the drawings and makes use of a collapsible frame which has a pair of pivotal support bows for support of a foldable fabric cover. The frame utilizes a pair of spaced clamps for engaging the windshield of a motorcycle sidecar when in an erected position. When not in use, the collapsible frame and fabric cover fold behind the seat of the sidecar onto the rear deck of the sidecar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and cope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible top which has all the advantages of the prior art convertible tops and none of the disadvantages.

It is another object of the present invention to provide a new and improved convertible top which may be easily and efficiently manufactured and marketed.

It is a further object of the present invention to provide a new and improved convertible top which is of a durable and reliable construction.

An even further object of the present invention is to provide a new and improved convertible top which is susceptible of a low cost of manufacture with regard to both materials and labor, and which accordingly is then susceptible of low prices of sale to the consuming public, thereby making such convertible tops economically available to the buying public.

Still yet another object of the present invention is to provide a new and improved convertible top which provides in the apparatuses and methods of the prior art some of the advantages thereof, while simultaneously overcoming some of the disadvantages normally associated therewith.

Still another object of the present invention is to provide a new and improved convertible top for a motorcycle sidecar which utilizes a collapsible frame and a foldable fabric cover which may be folded to a retracted position behind the seat of the sidecar when not in use.

Yet another object of the present invention is to provide a new and improved convertible top for a motorcycle sidecar which utilize a collapsible frame provided with a pair of spaced clamps for engaging the sidecar windshield when in an erected position.

Even still another object of the present invention is to provide a new and improved convertible top for a motorcycle sidecar which may be selectively raised or lowered without removing the top from the sidecar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a diagrammatic view illustrating the manner of operation of the collapsing frame of the convertible top of the present invention.

FIG. 6 is a diagrammatic front view of the collapsible convertible top frame of the present invention in a raised position.

FIG. 7 is a detail view of the pivotal connection of the collapsible convertible top frame of the present invention.

FIG. 8 is a side view of the pivot mechanism of FIG. 7.

FIG. 9 is a top detail view of a mounting bracket for securing the collapsible frame to the floor of a sidecar.

FIG. 10 is a side view of the mounting bracket of FIG. 9.

FIG. 11 is a top detail view of the windshield engaging clamp of the collapsible convertible top of the present invention.

FIG. 12 is a side cross sectional view of the window engaging clamp of FIG. 11.

DESCRIPTION OF THE PREFERRED EMBODIMENT

Figure 1:
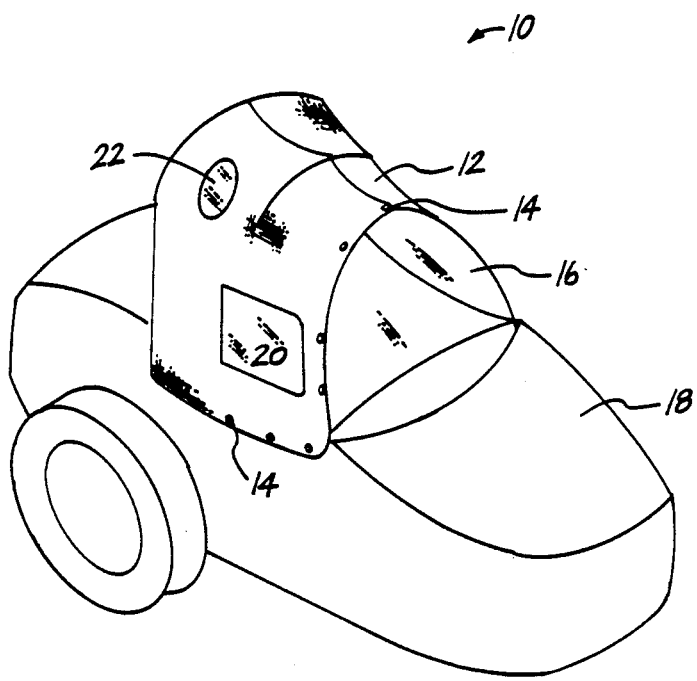
FIG. 1 is a perspective view of a motorcycle sidecar illustrating the convertible top of the present invention in a raised position.

With reference now to the drawings, and in particular to FIG. 1 thereof, a new and improved convertible top embodying the principles and concepts of the present invention and generally designated by the reference numeral 10 will be described.

More specifically, it will be noted that the first embodiment 10 of the invention includes a foldable fabric cover 12 provided with a plurality of snap fasteners 14 for engagement with cooperating snap fasteners on the sides and windshield 16 of the motorcycle sidecar 18. The fabric cover 12 may be provided with portholes 22 and windows 20. The windows 20 and portholes 22 may be formed from a transparent flexible plastic material sewn to the fabric cover 12. Selected side portions of the window 20 may be provided with hook and loop strips so that the window 20 may be selectively folded to an open position. The hinged portion of the window is sewn to the fabric cover 12, while the other sides of the window 20 are provided with hook and loop fastening strips. By selectively positioning the sewn hinged portion of the window 20, the window may be designed to open in any desired direction. The windows 20 may be positioned as desired on the rear, sides or top of the fabric cover 12.

Figure 2:
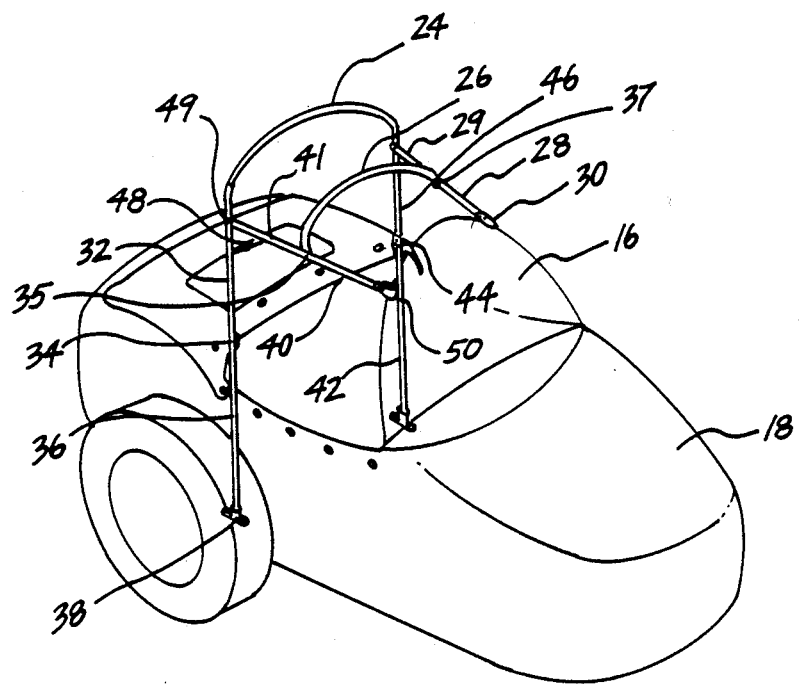
FIG. 2 is a perspective view of a motorcycle sidecar illustrating the collapsible frame of the convertible top of the present invention in a raised position.

With reference now to FIG. 2, the collapsible frame for supporting the foldable fabric cover 12 will now be described. A pair of spaced vertical supports 36 and 42 are fastened by brackets 38 to the floor of the sidecar 18, within the interior passenger compartment. Opposite ends 32 and 37 of a first U shaped support bow 24 are pivotally connected at 34 to the ends of the vertical supports 36 and 42. A pair of side support rails 41 and 29 are pivotally connected at 49 on opposite sides of the U shaped support bow 24. A pair of support braces are pivotally connected at each end to the first support bow 24 and the side support rails 41 and 29. Each end of the support braces 48 is pivotally attached and each support brace 48 has an intermediate pivotal connection. A second U shaped support bow 26 has opposite ends pivotally connected to the free ends of the side support rails 29 and 41. A pair of front support bars 28 and 40 are also pivotally connected at 35 and 37 to the free ends of the side support rails 41 and 29. A pair of windshield engaging clamps 30 and 50 are attached to the free ends of the front support bars 38 and 40.

Figure 3:
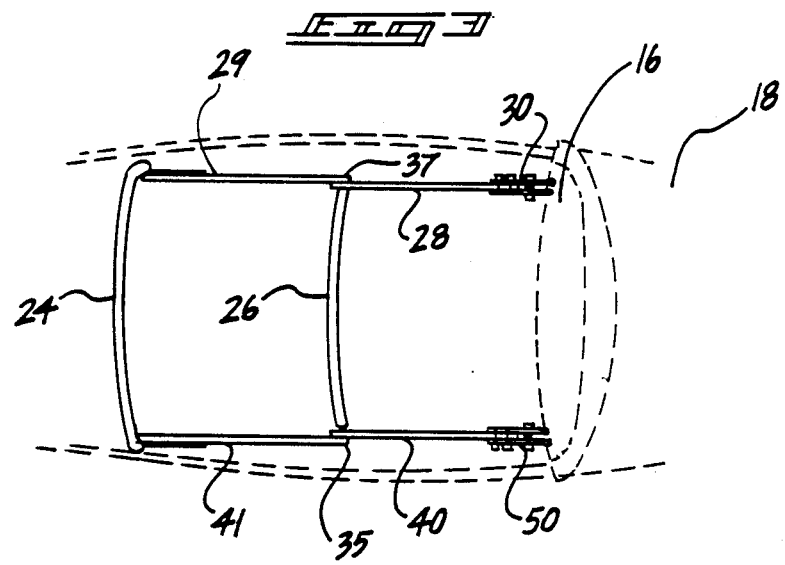
FIG. 3 is a top view of the collapsible frame of the convertible top of the present invention in a raised position.

With reference now to FIG. 3, which is a top view of the collapsible convertible top frame in a raised position, it may be seen that the windshield engaging clamps 30 and 50 are releasably secured to the edges of the sidecar windshield 16.

Figure 4:
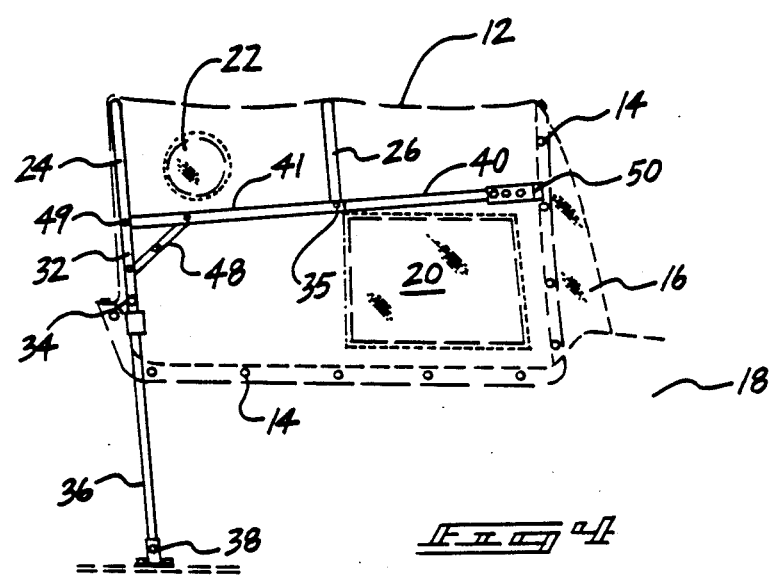
FIG. 4 is a side view illustrating the convertible top of the present invention in a raised position.

In FIG. 4, a diagrammatic view is provided illustrating the foldable fabric cover 12 disposed over the collapsible frame in an erected position. A plurality of spaced snaps 14 is provided around the periphery of the cover 12 for engagement with cooperating snap fasteners provided on the sides and windshield 16 the sidecar 18.

In the diagrammatic illustration of FIG. 5, the manner of folding the collapsible frame to the illustrated retracted position is illustrated in dotted lines. Due to the pivotal connections between the supporting elements, the collapsible frame may be folded to a compact and unobtrusive storage position, in which it rests on a rear deck of the sidecar 18. Although not illustrated, it should be noted that the foldable fabric cover 12 will be folded over the collapsible frame and also rest on the rear deck of the sidecar 18. It is pointed out, that prior to folding the convertible top 10 of the present invention to a retracted position, that the windshield engaging clamps 30 and 50 must be removed from the sidecar wi 16. Snaps 14 must also be unfastened from the snaps on the windshield 16 and partially unfastened from the sides of the sidecar 18.

In FIG. 6, a front view illustrating the collapsible of the convertible top 10 of the present invention is In FIG. 7, a detail view illustrating the connection of the support race 48 to the end 32 of the first U shaped support bow 24 is provided. One end of the support brace 48 is pivotally connected by a screw or rivet at 61 to the end of the first support bow 32. A pivotal connection 62 is provided intermediate the ends of the support brace 48. An opposite end of the support brace 48 is pivotally connected at 63 to the side support rail 41.

In FIG. 8, a side view illustrating the details of the pivotal connections between the support brace 48, side support rail 41 and first support bow 32 is provided.

With reference now to FIG. 9, a top view is provided illustrating the details of the mounting bracket 38 for mounting the ends of the vertical supports 36 and 42 to the floor of the sidecar 18. A pair of bolts 59 and 60 extend through the mounting bracket 38 and through the floor of the sidecar 18.

In FIG. 10, a side view, partially in cross section, further illustrates the construction of the mounting bracket 38.

In FIG. 11, a top view is provided illustrating the constructional details of the windshield engaging clamp 50.

In FIG. 12, a side cross sectional view of the windshield engaging clamp 50 is provided. A pair of screws 51 and 52 extend through a pair of flexible strips 56 and 57 as well as the end of the front support bar 40. A bolt 53 extends transversely through the flexible strips 56 and 57. A coil spring 58 surrounds the bolt 53 between the flexible strips 56 and 57. A wing nut 54 is utilized to adjust the spacing between the flexible strips 56 and 57, thus enabling the windshield 16 of the sidecar 18 to be clamped between the flexible strip 57 and the concave lip 55 of the flexible strip 56. Upon loosening of the wing nut 54, the coil spring 58 urges the flexible strip 56 and 57 apart, thus unclamping the windshield 16.

The vertical supports, supporting bows, front support bars and side support rails may be formed from rigid metal tubes, or may be formed from wood or rigid plastic materials. The various pivotal connections may be formed as rivets, bolts, screws and may be provided with conventional cam locks or threaded fasteners such as wing nuts to secure the pivotal connections in a locked position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A convertible top for a motorcycle sidecar, comprising:
    a pair of spaced vertical supports;
    means for connecting said vertical supports to a floor of a motorcycle sidecar;
    a first U-shaped support bow;
    means pivotally connecting ends of said first support bow to said vertical supports;
    a pair of side support rails;
    means pivotally connecting one end of each of said side support rails to opposite sides of said first support bow;
    a pair of support braces, each support brace having an intermediate pivotal connection;
    means pivotally mounting one end of each of said support braces to opposite sides of said first support bow, beneath said side support rails;
    means pivotally mounting an opposite end of each of said support braces to one of said side support rails;
    a second U-shaped support bow,
    means pivotally connecting each end of said second support bow to an end of one of said side support rails;
    a pair of front support bars;
    means pivotally connecting one end of each of said front support bars to an end of one of said side support rails;
    a windshield engaging clamp on an opposite end of each of said front support bars;
    each of said windshield engaging clamps comprising a pair of spaced flexible strips mounted on said front support bar, a bolt transversely extending between said flexible strips, a coil spring around said bolt between said flexible strips and a wing nut on said bolt;
    a foldable fabric cover disposed over said first and second support bows; and
    snap fasteners around the periphery of said fabric cover for engaging cooperating snap fasteners on the sides and windshield of said sidecar.

2. A convertible top for motorcycle sidecars, comprising:
    a collapsible frame;
    said collapsible frame having a pair of spaced vertical supports;
    means for mounting said vertical supports on the floor of a sidecar;
    a first U-shaped bow pivotally mounted to each of said vertical supports;
    a pair of side support rails pivotally mounted on opposite sides of said first U-shaped bow;
    a second U-shaped bow pivotally mounted to each of said side support rails;
    a pair of front support bars pivotally mounted to said side support rails;
    windshield clamp means on each of said front support bars;

a pair of pivotal support braces, each of said support braces having an intermediate pivotal connection, and each of said support braces having one end pivotally mounted on said first U-shaped support bow and having an opposite end pivotally mounted on one of said side support rails; and foldable cover means over said collapsible frame.

* * * * *